United States Patent Office 3,177,169
Patented Apr. 6, 1965

3,177,169
SPINNING SOLUTIONS COMPOSED OF ACRYLO-
NITRILE POLYMERS AND FLUOBORIC ACID
Larry L. Crooks and Julian J. Hirshfeld, Decatur, Ala.,
assignors to Monsanto Company, a corporation of
Delaware
No Drawing. Filed Dec. 17, 1962, Ser. No. 244,900
3 Claims. (Cl. 260—29.1)

This invention is concerned with a new solvent for acrylic polymers. More particularly, this invention is concerned with a new solvent for acrylonitrile polymers which not only will dissolve the polymers but will improve the flame resistance of coagulated articles as well as rendering them transparent.

The acrylonitrile polymer has many properties which favor its use in shaped articles, such as films, filaments, fibers, threads, yarns and the like. In order to produce the above articles, it is necessary that the polymeric compositions be dissolved in a suitable solvent since melt spinning techniques are not satisfactory with acrylonitrile polymers. Many of the known solvents for polymeric acrylonitrile compositions have defects such as toxicity, excessively high melting points, excessively high boiling points, poor solvent power and high cost of use. In addition, there are very few of the many organic solvents which will adequately dissolve the acrylonitrile polymers so they may be used in producing their useful articles. In addition, when many of these articles have been produced from a composition of solvent and acrylonitrile polymers, using the few known organic solvents, these articles possessed a drawback of being easy to ignite and support flames. There are a number of inorganic compounds such as the salts of lithium or zinc and others which dissolve acrylonitrile polymers; however, they are not useful because the acrylonitrile polymers cannot be recovered from the solvents.

It is the principal object of this invention to provide a new composition of matter composed of a solvent for polymerized vinyl compounds and the vinyl compounds.

A further object of this invention is to provide a new solvent for polymerized acrylonitrile polymers.

A further object of this invention is to provide a method for producing a new composition of matter composed of acrylonitrile polymers and fluoboric acid.

Other objects and advantages of this invention will become apparent from the hereinafter detailed description.

The objects of this invention are generally accomplished by dissolving acrylonitrile polymers in a solvent of fluoboric acid.

More specifically, the objects of this invention are accomplished by dissolving acrylonitrile polymers in 2 percent to 100 percent of a 48 percent solution of fluoboric acid with the preferred amount of the acid being 30 percent, based upon the weight of the polymer. Obviously, more concentrated acids than the 48 percent solution may be used. Once the polymer has been introduced into the solution of fluoboric acid, it may be heated to increase the rate of solution up to 100° C. with the preferred temperature being 80–85° C. The polymer will dissolve slowly at room temperature in the acid solution.

While this invention has been generally directed to acrylonitrile polymers, the polymeric materials, which may be employed in the practice of this invention, are polyacrylonitrile, copolymers, including binary and ternary polymers containing at least 80 percent by weight of acrylonitrile in the polymer molecule, or a blend comprising polyacrylonitrile or copolymers comprising acrylonitrile with from 2 percent to 50 percent of another polymeric material, the blend having an overall polymerized acrylonitrile content of at least 80 percent by weight.

While the preferred polymers employed in the instant invention are those containing at least 80 percent of acrylonitrile, generally recognized as the fiber forming acrylonitrile polymers, it will be understood that the invention is likewise applicable to polymers containing less than 80 percent acrylonitrile. The acrylonitrile polymers containing less than 80 percent acrylonitrile are useful in forming films, coating compositions, molding operations, lacquers, the modacrylic fibers, etc.

For example, the polymer may be a copolymer of from 80 percent to 98 percent acrylonitrile and from 2 percent to 20 percent of another monomer containing the >C=C< linkage and copolymerizable with acrylonitrile. Suitable mono-olefinic monomers include acrylic, alpha-chloroacrylic and methacrylic acids; the acrylates, such as methylmethacrylate, ethylmethacrylate, butylmethacrylate, methoxymethyl methacrylate, beta-chloroethyl methacrylate, and the corresponding esters of acrylic and alpha-chloroacrylic acids; vinyl chloride, vinyl fluoride, vinyl bromide, vinylidene chloride, 1-chloro-1-bromoethylene; methacrylonitrile; acrylamide and methacrylamide; alpha-chloroacrylamide; or monoalkyl substituted products thereof; methylvinyl ketone; vinyl carboxylates, such as vinyl acetate, vinyl chloroacetate, vinyl propionate, and vinyl stearate; N-vinylimides, such as N-vinylphthalimide and N-vinylsuccinimide; methylene malonic esters; itaconic acid and itaconic esters; N-vinylcarbazole; vinyl furane; alkyl vinyl esters; vinyl sulfonic acid; ethylene alpha, beta-dicarboxylic acids or their anhydrides or derivatives, such as diethylcitraconate, diethylmesaconate, styrene, vinyl naphthalene; vinyl-substituted tertiary heterocyclic amines, such as the vinylpyridines and alkyl-substituted vinylpyridines, for example, 2-vinylpyridine, 4-vinylpyridine, 2-methyl-5-vinylpyridine, etc.; 1-vinylimidazole and alkyl-substituted 1-vinylimidazole such as 2-, 4-, or 5-methyl-1-vinylimidazole, and other >C=C< containing polymerizable materials.

The polymer may be a ternary or higher interpolymer, for example, products obtained by the interpolymerization of acrylonitrile and two or more of any of the monomers, other than acrylonitrile, enumerated above. More specifically, and preferably the ternary polymer comprises acrylonitrile, methacrylonitrile, and 2-vinylpyridine. The ternary polymer preferably contains from 80 percent to 98 percent of acrylonitrile, from 1 percent to 10 percent of a vinylpyridine or a 1-vinylimidazole, and from 1 percent to 18 percent of another substance such as methacrylonitrile or vinyl chloride.

The polymer may also be a blend of a polyacrylonitrile or of a binary interpolymer of from 80 percent to 99 percent acrylonitrile and from 1 percent to 20 percent of at least one other >C=C< containing substance with from 2 percent to 50 percent of the weight of the blend of a copolymer of from 10 percent to 70 percent of acrylonitrile and from 30 percent to 90 percent of at least one other >C=C< containing poyymerizable monomer. Preferably, when the polymeric material comprises a blend, it will be a blend of a copolymer of 90 percent to 98 percent acrylonitrile and from 2 percent to 10 percent of another mono-olefinic monomer, such as vinyl acetate, with a sufficient amount of a copolymer of from 10 percent to 70 percent acrylonitrile and from 30 percent to 90 percent of a vinyl-substituted tertiary heterocyclic amine, such as vinylpyridine or 1-vinylimidazole, to give a dyeable blend having an overall vinyl-substituted tertiary heterocyclic amine content of from 2 percent to 10 percent based on the weight of the blend.

The following examples are cited to illustrate the invention. They are not intended to limit it in any way. Unless otherwise noted, percentages as expressed in the examples indicate percent by weight.

Example 1

Ten grams of polymer composed of 94 percent acrylonitrile and 6 percent vinyl acetate were introduced into a flask containing 90 grams of a 48 percent solution of fluoboric acid. This mixture was heated to 80° C. to 85° C. with stirring. This heat was maintained for 20 minutes. A clear, slightly yellow dope resulted. This dope was poured into water which gave a white shaped rod. Ninety grams of 48% fluoboric acid solutions represents 43.2 grams of pure acid. The acid to polymer ratio is thus about 4:1 by weight.

Example 2

Five grams of a polymer composed of 94 percent acrylonitrile and 6 percent vinyl acetate was introduced into a flask containing 40 grams of 48 percent fluoroboric acid. The mixture was heated to 60° C. with stirring for 15 minutes. This dope was then poured into water and a white filament was obtained. Forty grams of 48% fluoboric acid solution represents 19.2 grams of pure acid. The acid to polymer ratio is thus about 4:1 by weight.

Thus with the solvent of this invention one is able to obtain excellent dope which may be used in the spinning of acrylic articles. Not only is this solvent a good dissolver of the polymers of acrylonitrile, but the articles obtained from this dope when coagulated possess improved flame retardation.

Many modifications of the above invention will be obvious to those skilled in the art without a departure from the inventive concept.

We claim:

1. A spinning solution composed of one part by weight of polymers of at least 80 percent acrylonitrile and up to 20 percent of another mono-olefinic copolymerizable monomer therewith and four parts by weight of fluoboric acid.

2. A spinning solution composed of a polymer of one part by weight of 94 percent acrylonitrile and 6 percent vinyl acetate and four parts by weight of fluoboric acid.

3. A spinning solution composed of a polymer of one part by weight of a blend of two copolymers, 88 percent of a first copolymer, said first copolymer being 94 percent acrylonitrile and 6 percent vinyl acetate and 12 percent of a second copolymer, said second copolymer being 50 percent acrylonitrile and 50 percent methyl vinylpyridine, and four parts by weight of fluoboric acid.

No references cited.

MORRIS LIEBMAN, *Primary Examiner.*